United States Patent
Johansson et al.

(10) Patent No.: US 9,965,053 B2
(45) Date of Patent: May 8, 2018

(54) TOUCHPEN FOR CAPACITIVE TOUCH PANEL AND METHOD OF DETECTING A POSITION OF A TOUCHPEN

(71) Applicant: SONY CORPORATION, Minato-ku, Tokyo (JP)

(72) Inventors: Magnus Ola Johansson, Dösjebro (SE); Peter Ljung, Lund (SE); Alexander Hunt, Tygelsjö (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 102 days.

(21) Appl. No.: 14/381,162

(22) PCT Filed: Sep. 26, 2013

(86) PCT No.: PCT/IB2013/002142
§ 371 (c)(1),
(2) Date: Aug. 26, 2014

(87) PCT Pub. No.: WO2015/044701
PCT Pub. Date: Apr. 2, 2015

(65) Prior Publication Data
US 2015/0293613 A1    Oct. 15, 2015

(51) Int. Cl.
*G06F 3/0354* (2013.01)
*G06F 3/044* (2006.01)

(52) U.S. Cl.
CPC .......... *G06F 3/03545* (2013.01); *G06F 3/044* (2013.01)

(58) Field of Classification Search
CPC .............................. G06F 3/03545; G06F 3/044
See application file for complete search history.

(56) References Cited

U.S. PATENT DOCUMENTS 9,195,351 B1 * 11/2015 Rosenberg ............ G06F 1/1626
9,213,424 B1 * 12/2015 Dunn .................... G06F 3/03545
(Continued)

FOREIGN PATENT DOCUMENTS

WO     2012124280 A1    9/2012

OTHER PUBLICATIONS

International Search Report dated May 16, 2014, issued in corresponding PCT application PCT/IB2013/002142, 11 pages.
(Continued)

*Primary Examiner* — Abhishek Sarma
(74) *Attorney, Agent, or Firm* — Tucker Ellis, LLP (57) ABSTRACT

The disclosure relates to the technical field of capacitive touch panels and discloses a touchpen which may be used in mobile phones, computers and other devices with touch panels for writing characters, letters and other symbols. In particular it relates to a capacitive touchpen 10 for inputting information into an electronic device 1 through touching of a capacitive touch panel 30, the capacitive pen comprising an elongated body member 11 comprising a conductive part 13 and a tip 12 disposed at one end of the body member 11 having a contact surface 14 for contacting the capacitive touch panel 30. The conductive part 13 is configured such that the distortion of the touch panel's electrostatic field caused by the conductive part 13 when changing the position of the touchpen 10 in relation to the capacitive touch panel 30, when the contact surface is kept in contact with the touch panel 30, is sufficient to register a change in capacitance by the capacitive touch panel 30. The disclosure further relates to methods for detecting the position of a touch pen as well as to an electronic device and a computer program.

10 Claims, 7 Drawing Sheets

(56) References Cited

U.S. PATENT DOCUMENTS

| | | | |
|---|---|---|---|
| 2008/0106520 A1 | 5/2008 | Free et al. | |
| 2008/0166048 A1* | 7/2008 | Raif | G06F 3/03545 382/187 |
| 2009/0008162 A1 | 1/2009 | Yang et al. | |
| 2011/0285670 A1 | 11/2011 | Xiang | |
| 2012/0206330 A1* | 8/2012 | Cao | G06F 3/0383 345/156 |
| 2012/0327040 A1* | 12/2012 | Simon | G06F 3/044 345/179 |
| 2012/0327042 A1* | 12/2012 | Harley | G06F 3/044 345/179 |
| 2015/0077403 A1* | 3/2015 | Bell | G06F 3/044 345/179 |

OTHER PUBLICATIONS

Office Action from corresponding European Application No. 13810997, dated Oct. 25, 2017, 9 pages.

* cited by examiner

TOUCHPEN FOR CAPACITIVE TOUCH PANEL AND METHOD OF DETECTING A POSITION OF A TOUCHPEN

TECHNICAL FIELD

The disclosure relates to the technical field of capacitive touch panels and discloses a touchpen which may be used in mobile phones, computers and other devices with touch panels for writing characters, letters and other symbols as well as for painting, drawing, illustration, re-touching photos. In particular it relates to a touchpen making it possible to detect the position, such as tilt and distance, of the touchpen in relation to a touch panel. The disclosure further relates to methods for detecting the position of a touch pen as well as to an electronic device and a computer program.

BACKGROUND

Touch panel devices that can be operated by an operator directly touching a screen while images are displayed on the screen are commonly known. Such touch panel devices are often used in a portable information processing terminals such as a PDAs (Personal Digital Assistants), cellular phone terminals, Smartphones, or the like (hereafter called "electronic devices"). A touch panel device has a touch panel to detect an object approaching the surface. Types of touch panels include a resistor film method that detects resistor value changes to a touched portion, a capacitance type that detects capacitance changes to the touched portion, an electromagnetic conduction method to detect the position of an body with the electromagnetic energy of an body dedicated to emitting a magnetic field, and so forth. Recently, use of capacitance-type touch panels have increased, particularly in the cellular phone terminal and Smartphone markets.

When touch sensitive mobile phones and PDA's were first introduced the main input device was a pen. This changed when Smartphones were introduced where all input was made with your fingers. With finger input, capacitive touch sensors replaced other technologies (like resistive sensors used for pen input) due to increased finger touch sensitivity. Capacitive sensors allowed a lower finger pressure to be detected compared with other technologies.

However, pen input are coming back with recent products. In recent products the capacitive sensors are sometimes complemented, with active pen technology. Active pens allow detection of pen pressure and tilt which cannot be measured directly using capacitive sensors. In these devices, tilt and pressure are e.g. measured by the pen itself and sent to the phone through radio communication.

Typically when drawing on a touch screen, the distance (assume distance of pen tip from surface) is not used, but rather pressure of the pen. Compare with a normal graphite pen. Pressure in current capacitive touch solutions with passive pointers are artificially calculated based on the size of the pointer. A large pointer size is interpreted as much pressure and a small pointer is interpreted as little pressure. When fingers are used as input means it is actually possible to measure pressure indirectly. When the finger is pressed harder against the surface, the size of the contact surface, will increase which is detected by the sensor. There are touchpens designed with a relatively large and soft pen tip (like a finger) which allow pen pressure to be measured in the same way. But when a pen is used for drawing or writing a small pen tip is preferred to allow better visual feedback during drawing.

The sensitivity of capacitive sensors are also being improved which allow almost any kind of passive pen to be used as input device, as long as it is conductive. As an example an ordinary graphite pen with a tip area of at least 1-2 mm may be used with current state of the art technology, but then pen pressure or tilt cannot be measured. Graphite is stiff and can not change footprint which makes it difficult or even impossible to measure preassure with this technology.

SUMMARY

This disclosure presents a solution where a passive pen on a capacitive touch sensor can allow both pressure and tilt to be measured without using the pointer size or only use it as a complement. This allows the same functionality as an active pen technology, but with no additional cost from dual touch sensor solutions, i.e. touch screens having an additional solution for handling pens.

According to one aspect the present disclosure relates to a capacitive touchpen for inputting information into an electronic device through touching of a capacitive touch panel. The capacitive pen comprises an elongated body member comprising a conductive part and a tip disposed at one end of the body member having a contact surface for contacting the capacitive touch panel. The conductive part is configured such that the distortion of the screen's electrostatic field caused by the conductive part when changing the position of the touchpen in relation to the capacitive touch panel, when the contact surface is kept in contact with the touch panel, is sufficient to register a change in capacitance by the capacitive touch panel.

Thereby, the position of the pen may be detected, because the conductive part will generate a capacitive foot print which depends on the position, e.g. tilt, of the pen. In use the pen would of course often be moving. However, at a certain moment, it is then possible to detect both the touched point of the pen (x,y) and a value or values corresponding to the position. The position may be translated to e.g. tilt and/or pressure, depending on the design of the pen, as will be shown in the embodiments below.

According to one aspect the tip is thinner than the elongated body member. A thin tip enables drawing detailed patterns. According to one aspect the tip is retractable. It is then possible to decrease the distance between the conductive part of the body and the capacitive touch panel is decreased by pushing the retractable tip into the body.

According to one aspect the tip is held by an elastic member such that the retraction depends on the pressure applied on the tip. According to one aspect the distance between the conductive part and the capacitive touch panel can be decreased by tilting the body.

According to one aspect the tip is conductive. According to one aspect the conductive part is electrically coupled to the tip. Electrical coupling will increase the foot print of the conductive part.

According to one aspect the disclosure relates to a method in an electronic device of detecting the position of a touchpen used for inputting information into the electronic device through touching of a capacitive touch panel, the touchpen comprising an elongated body member comprising a conductive part and a tip disposed at one end of the body member. The method comprises detecting contact of the tip at the capacitive touch panel, measuring a distortion of the screen's electrostatic field and determining a change in position of the touchpen in relation to the capacitive touch panel, based on the distortion of the screen's electrostatic field caused by the conductive part.

According to one aspect the change in position is detected using the shape of the distortion of the screen's electrostatic field. According to one aspect the change in position is detected using the size of the distortion of the screen's electrostatic field. According to one aspect the change in position is detected using the amplitude of the distortion of the screen's electrostatic field.

According to one aspect the disclosure relates to a wireless device configured to execute the method described above.

According to one aspect the disclosure relates to a computer program, comprising computer readable code which, when run on a wireless network node in a cellular communication system, causes the node to perform the method as described above.

BRIEF DESCRIPTION OF THE DRAWINGS

The present technique will be more readily understood through the study of the following detailed description of the embodiments/aspects together with the accompanying drawings, of which.

It should be added that the following description of the embodiments is for illustration purposes only and should not be interpreted as limiting the disclosure exclusively to these embodiments/aspects.

DETAILED DESCRIPTION

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

Embodiments of the present invention will be exemplified using a mobile communication device such as a mobile phone. However, it should be appreciated that the invention is as such equally applicable to electronic devices which have touch detection capabilities. Examples of such devices may for instance be any type of mobile phone, laptop (such as standard, ultra portables, netbooks, and micro laptops) handheld computers, portable digital assistants, tablet computers, gaming devices, accessories to mobile phones, etc. However, for the sake of clarity and simplicity, the embodiments outlined in this specification are exemplified with, and related to, mobile phones only.

Figure 1:
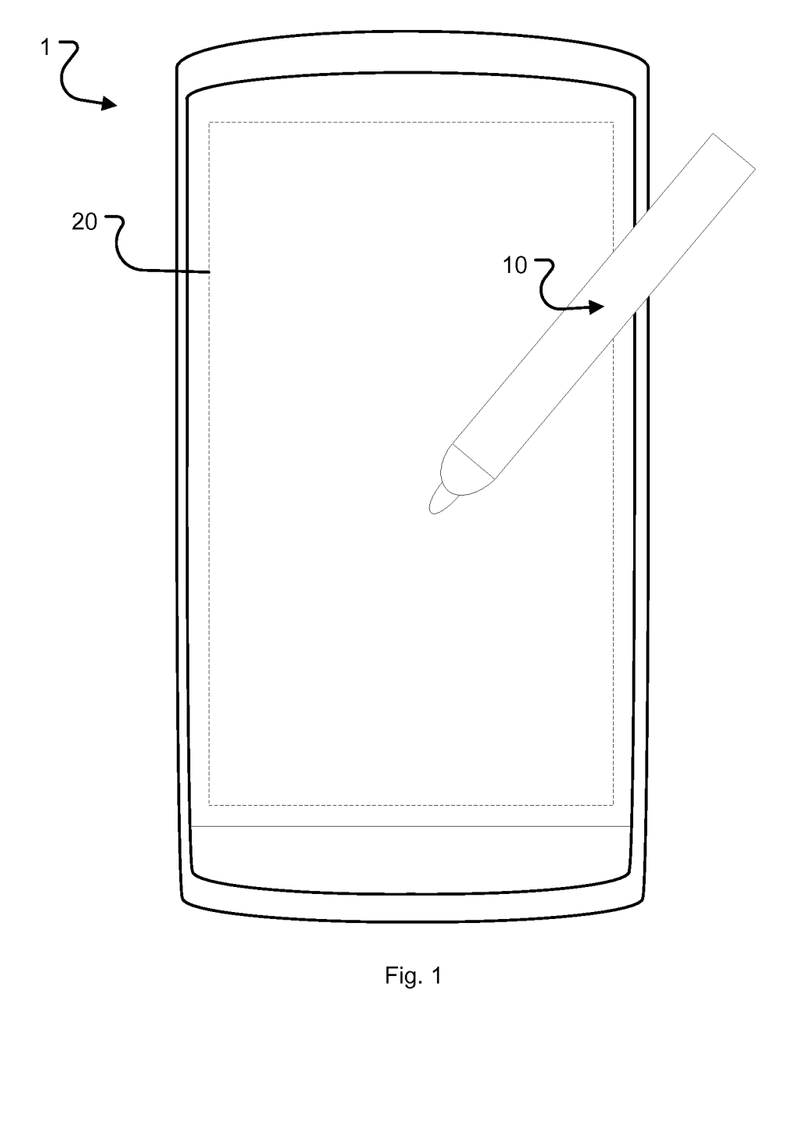
FIG. 1 illustrates inputting information in an electronic device using a touchpen.

FIG. 1 illustrates inputting information in an electronic device 1 having a touch panel device 20 using a touchpen 10. Note that according to the present embodiment, an example is given wherein the touch panel device 20 is applied to the portable terminal 1, but should not be limited to this.

Figure 2A:
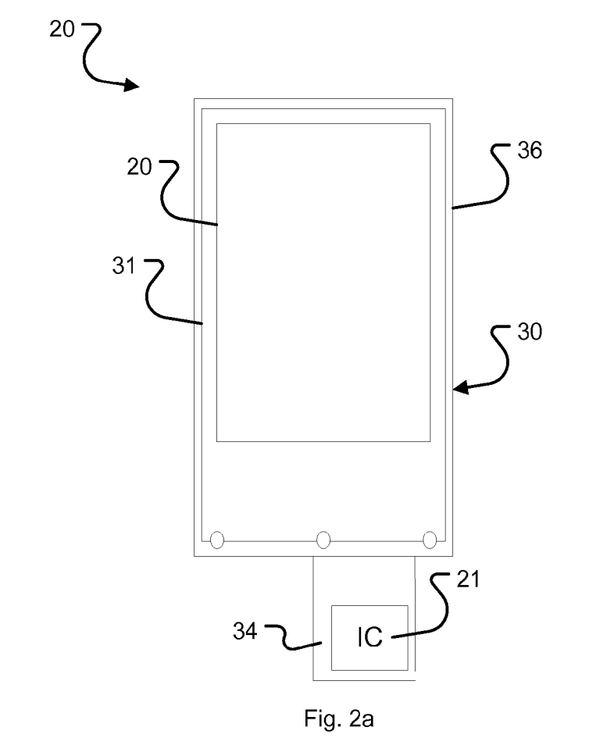
FIGS. 2a and 2b shows a schematic configuration of a capacitance-type touch panel device.
Figure 2B:
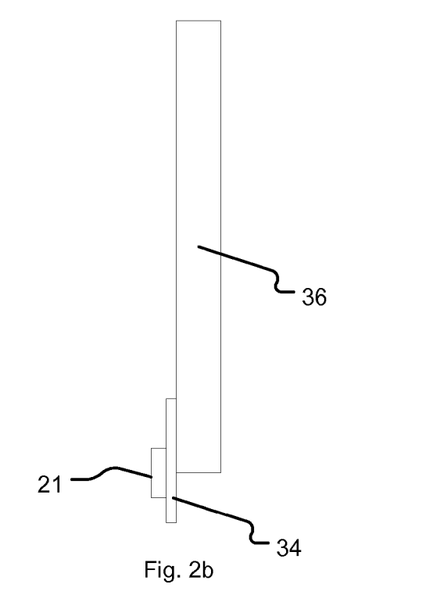

FIG. 2 shows a schematic configuration of a capacitance-type touch panel device 20. Note that FIG. 2a shows a diagram as seeing the touch panel 30 from the front, and FIG. 2B shows a diagram as seeing the touch panel 30 from the side.

Figure 2C:
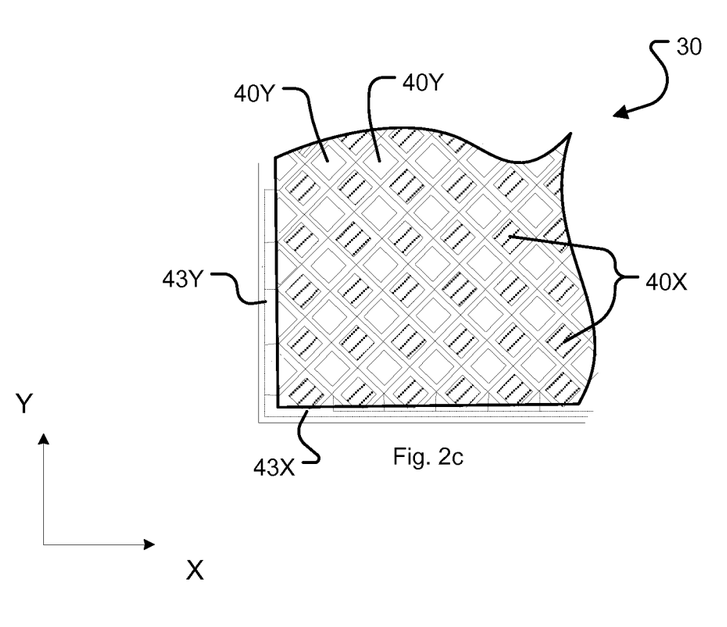
FIG. 2c is a descriptive diagram schematically showing an expanded view of a rectangular transparent electrode unit.

FIG. 3 is a descriptive diagram schematically showing an expanded view of a rectangular transparent electrode unit of the capacitance-type touch panel 30. The touch panel device 20 has an IC 21, touch panel 30, X-Y transparent electrode pattern unit 31, flexible print substrate 34, sensor glass unit 36, and so forth. The touch panel 30 is disposed so as to be layered over a display (see FIG. 1).

The X-Y transparent electrode pattern unit 31 is formed on the surface of the sensor glass unit 36 made up of e.g. a transparent glass plate. For example, multiple rectangular transparent electrode units 40X are arrayed in the X-direction and in multiple rows, and multiple rectangular transparent electrode units 40Y are arrayed in the Y-direction and in multiple rows.

The various rectangular transparent sensors or electrode units 40X arrayed in the X-direction in multiple rows are connected with a connecting unit between the various adjacent rectangular transparent electrode units 40X. Similarly, the rectangular transparent electrode units 40Y arrayed in the Y-direction in multiple rows are connected with a connecting unit between the various adjacent rectangular transparent electrode units 40Y. The various connecting units to connect between the various adjacent rectangular transparent electrode units 40X and the various connecting units to connect between the various adjacent rectangular transparent electrode units 40Y are each formed with a transparent electrode.

Also, the various rectangular transparent electrode units 40X that are on the outer most edges of the various rectangular transparent electrode units 40X connected in flexible print substrate 34 via the outer edge wiring pattern 43X. Similarly, the various rectangular transparent electrode units 40Y that are on the outer most edges of the various rectangular transparent electrode units 40Y are connected in an outer edge wiring pattern 43Y, and connected in a wiring pattern of a flexible print substrate 34 via the outer edge wiring pattern 43Y.

The IC 21 is mounted on the flexible print substrate 34, and is connected to the outer edge wiring pattern 43X and outer edge wiring pattern 43Y of the X-Y transparent electrode pattern unit 31 via the wiring pattern on the flexible print substrate 34. The IC 21 scans each of the various rectangular transparent electrode units 40X in the X-direction and the various rectangular transparent electrode units 40Y in the Y-direction of the X-Y transparent electrode pattern unit 31, and detects changes in capacitance in the X-direction and Y-direction. The coordinates value and the capacitance detection values when the object such as the finger of the user or a touchpen 10 nears the sensor surface of the touch panel 30 and so forth are calculated by the changes in the detected capacitance.

The format of the output of the touch panel device 20 varies between different devices. According to one example the output comprises the X and Y coordinates of a detected touch as well as a Z value. The Z value corresponds to the pressure and corresponds to the size and/or amplitude of the detected capacitance. Size in this case refers to the number of sensors or electrodes 40X, 40Y detecting change in capacitance. Amplitude corresponds to the value of each sensor. The output may as well comprise the form or shape of the detected capacitance.

Capacitive sensors can actually detect items above the surface of the panel. A conductive material does not have to touch the panel to change the capacitance, but the effect decreases fast relative the distance from the screen. Typically objects a few millimetres above the surface can be detected. With today's technology the maximum distance can range from 5-20 mm but is expected to improve in the future. A solution that allows pen input with a small tip while still allows pressure to be detected use this property.

Figure 3A:
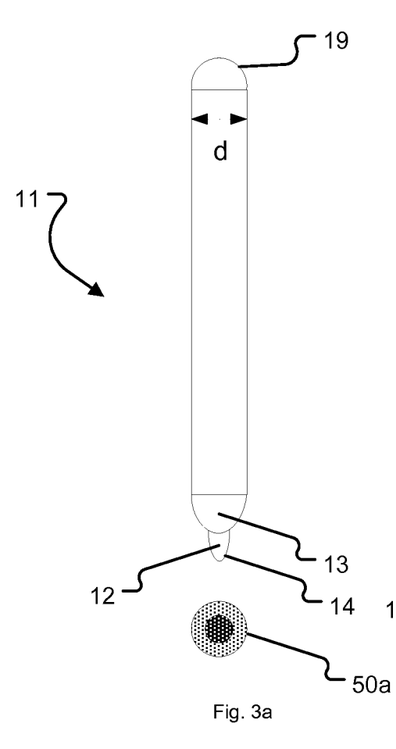
FIG. 3a-3b illustrates the touchpen according to one aspect of the invention.
Figure 3B:
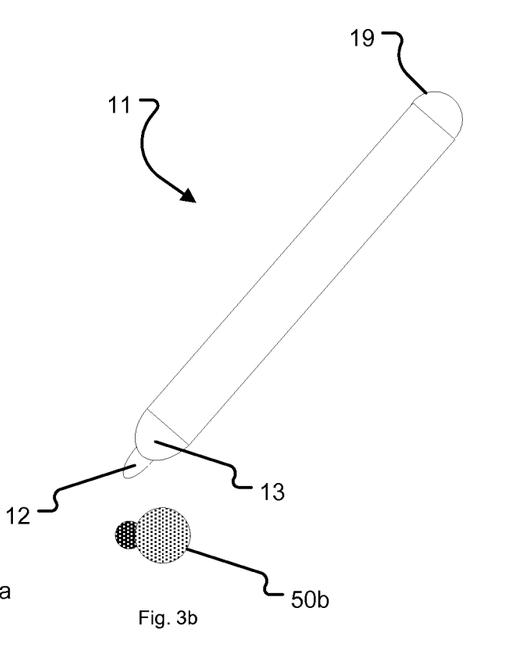

FIG. 3 discloses a passive capacitive touchpen 10 for inputting information into an electronic device through touching of a capacitive touch panel according to one aspect of the invention. The pen comprises a body member or housing 11 and a pen tip or tip 12. The body member 11 has an elongated shape. The elongated body member 11 comprises a conductive part. Hence, the body member 11 is at least partly conductive, but it may as well be completely made of a conductive material.

The tip 12 is disposed at one end of the body member 11. The tip 12 has a contact surface 14 for contacting the capacitive touch panel. Different parts of the contact surface 14 may be in contact with the touch panel depending on the tilt of the pen. According to one aspect the pen tip 12 is conductive. The tip is typically thinner than the elongated body member 11, meaning that it has a smaller diameter d. The tip is typically smaller than the grid of the touch panel, such that the tip alone cannot saturate a capacitive sensor of the display. The size is typically between 2-3 mm but may be larger or smaller.

According to one aspect the conductive part 13 is electrically coupled to the tip 12. Such an electrical connection will increase the capacitive foot print of the conductive part on the touch panel 30.

The dimensions and conductivity of tip 12 and of the conductive part 13 are optimized so that both the housing and tip produce capacitive foot prints 50, when used in a normal drawing situation. A foot print 50 implies a capacitance detectable by the capacitive touch panel. Hence, by measuring the size and shape of the foot print 50, a change in capacitance can be registered by the capacitive touch panel.

Figure 4A:
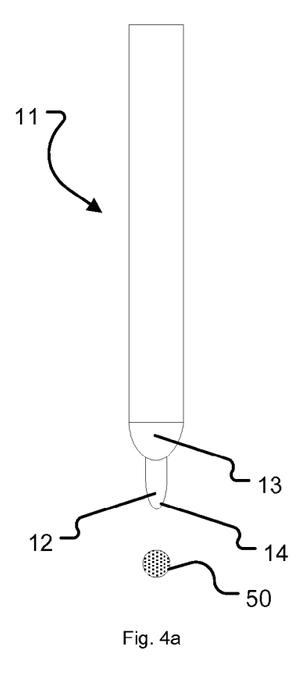
FIG. 4a-4c illustrates the touchpen according to one aspect of the invention.
Figure 4B:
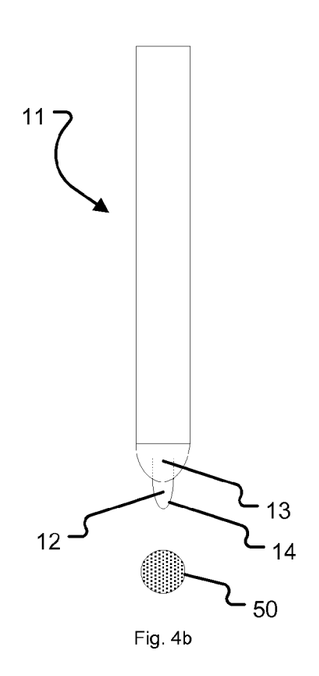
Figure 4C:
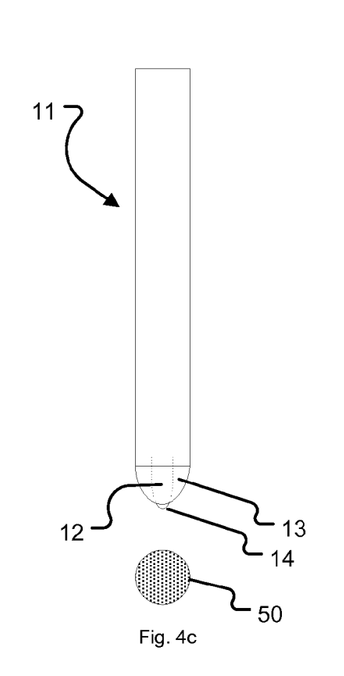

When the pen is held in an upright position as shown in FIG. 3a, the sensor readout will have a circular form 50a, because in an upright position, the tip and the conductive part are aligned above the touch panel 30. The conductive part 13 is positioned at the elongated body 11. In FIGS. 3 and 4 the conductive part is placed at one end of the elongated body 11. However, the conductive part may as well be placed apart from the tip as disclosed in FIG. 5.

When the pen is held in a normal drawing position as shown in FIG. 3b, (around 45 degrees towards the surface), the conductive part will move in a horisontal direction in relation to the board. However, both the tip and the conductive part will produce a capacitive footprint. Therefore, the sensor readout of the touch panel 30 will then have a non-circular form 50b. The pen tip will produce signal as well as the housing and depending on angle the effect from the housing will change. Because the touch panel can detect items above the surface of the panel, the conductive part will be "visible" to the touch panel. Hence, the conductive part 13 is configured such that the distortion of the screen's electrostatic field caused by the conductive part when changing the position of the touchpen in relation to the capacitive touch panel, when the contact surface is kept in contact with the touch panel, is sufficient to register a change in capacitance by the capacitive touch panel. Position here implied both tilt and also the distance between the body member 11 and the touch panel. Hence, the electrostatic field of the pen may change even though the tip is kept at the same place, i.e. the same (x,y) position at the screens's surface. The capacitive change in then caused by the movement of the conductive part. Hence, many different footprints correspond to one contact point between the pen tip 13 and the touch panel 30. These different footprints correspond to one position of the pen 10.

Thereby, the position of the pen may be detected, because the conductive part will generate a capacitive foot print which depends on the position, e.g. tilt, of the pen. In use the pen would of course often be moving. However, at a certain moment, it is then possible to detect both the touched point of the pen (x,y) and a value corresponding to the position. The position may be translated to e.g. tilt or pressure, depending on the design of the pen, as will be shown in the embodiments below.

For example, the distance between the conductive part and the capacitive touch panel can be decreased by tilting the body member 11 as disclosed in FIG. 3b. Thereby, by measuring the form, size and amplitude of the output signal from the capacitive sensor a good estimate of both pen direction and tilt is possible.

FIGS. 4a to 4c discloses a pen according to another aspect of the disclosure. In FIG. 4 the pen tip is held by a spring which lets the tip to be retracted dependent on pen tip pressure and the force of the spring working as an anvil against the pen tip when the pen tip is pressed towards the spring. Because the pen tip is retractable the sensor reading of the Z-value will increase when the pen is pressed harder against the surface because the conductive part 13 then comes closer to the surface. In other words, the pen tip is movable in relation to the conductive part in a telescopic way, i.e. the pen tip is telescopically suspended at the conductive part. In FIG. 4 the tip 12 is held by an elastic member such that the retraction depends on the pressure applied on the tip and the resilience of the elastic member working in the similar way as a springy anvil when the pen tip 12 is pressed towards the elastic member. Hence, according to one aspect the distance between the conductive part and the capacitive touch panel is decreased by pushing the retractable tip into the body. When the conductive part gets closer to the touch panel the z value of the capacitive sensor will increase. By measuring the form, size and amplitude of the output from the capacitive sensor a good estimate of pen pressure, direction and tilt is possible.

According to one aspect, pen tips are interchangeable. It is also possible to use springs with different spring coefficients to allow different pressure sensitivity. According to one aspect, spring pressure could also be changed through a mechanical button or screw on the pen that allow the length of the spring in its rest position to be changed. According to one aspect, an elastic member with varying elasticity or resilience may be used for allowing different pressure sensitivity. According to one aspect, an interchangeable elastic member may also be used meaning that a softer elastic member (with a lower resilience) may be replaced by a harder elastic member (with a higher resilience) or vice versa. According to one aspect, the pen tip and the elastic member may be interchangeable as separate entities for easy adjustment and change of the pressure sensitivity. According to one aspect, the pen tip and the elastic member may be interchangeable together as one unit for quick change of the pressure sensitivity depending on the need of the user. Another way to adjust pressure sensitivity is to use different conductive materials in the pen tip and the housing.

According to one aspect, shown in FIGS. 3a and 3b, the back of the pen can be modelled with a single conductive ball 19 (on a isolate housing) the readout from the end can be distinguished from the pen tip and in term be interpreted as another pen type e.g. an eraser.

According to one aspect, the surface of the pen housing is an isolate to remove affect from difference of conductivity from the hand. If the part of the pen where the user holds is insulated the signal from the pen will be the same between different users and thus easier to interpret.

Figure 5A:
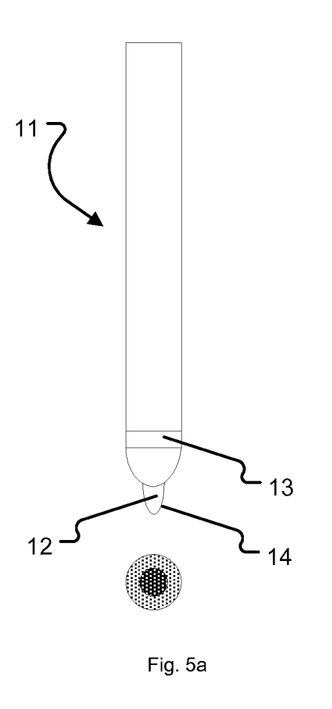
FIG. 5a-5b illustrates the touchpen according to one aspect of the invention.
Figure 5B:
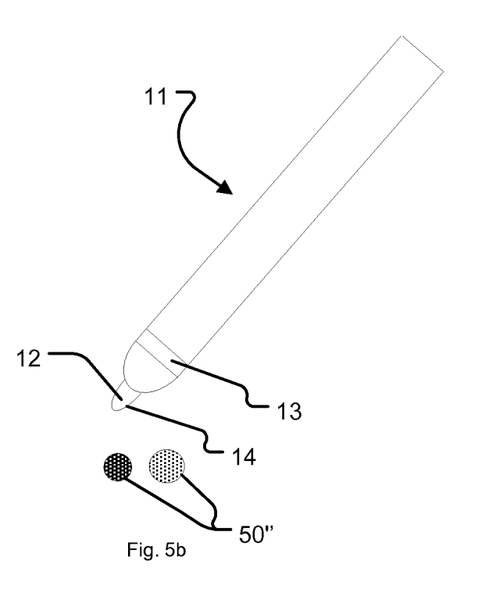

FIGS. 5a to 5b discloses a pen according to one aspect of the disclosure. In some situations it may be more effective to only have a narrow rim around the housing and let the rest of the housing be an isolate. In this case the capacitive footprint will look like two dots 50" instead of a non circular connected shape, when the pen is tilted.

Figure 6:
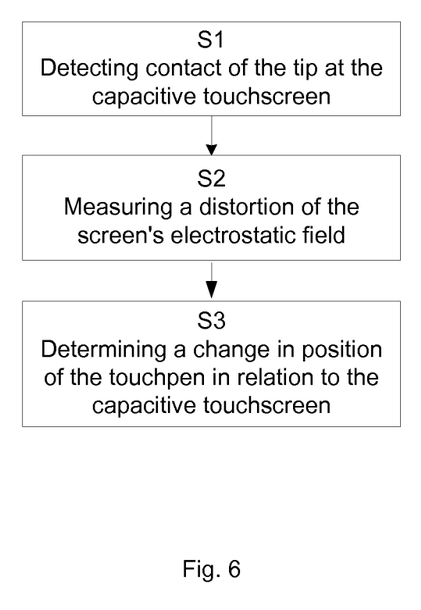
FIG. 6 discloses in a flowchart a method in an electronic device of detecting the position of a touchpen used for inputting information into the electronic device through touching of a capacitive touch panel.

FIG. 6 discloses in a flowchart a method in an electronic device of detecting the position of a touchpen used for inputting information into the electronic device through touching of a capacitive touch panel using a touchpen comprising an elongated body member comprising a conductive part and a tip disposed at one end of the body member as described above. The method is carried out within the electronic device, but may be executed in the IC 34 of the touch panel device as well an in the software of the electronic device 1.

The method is initiated when contact of the tip is detected S1 at the capacitive touch panel. The second step comprises measuring S2 a distortion of the screen's electrostatic field. This is typically performed by the IC 34 of the touch panel device 20. The IC then outputs touch data to the electronic device, where the further calculations are made. As an alternative all calculations are performed in the IC 34. The method may be executed in hardware, software or in a combination thereof.

In practice, it is not needed to detect the tip first and then detect the distortion of electrostatic field. The total distortion of the electrostatic field may be used to detect the tip and the body of the pen. This means that steps S1 and S2 may be integrated into one step.

The final step comprises determining S3 a change in position of the touchpen in relation to the capacitive touch panel, based on the distortion of the screen's electrostatic field caused by the conductive part. This step e.g. implies analysing the shape of the capacitive field and determining the direction of the pen based on the field. If the foot print of the conductive part 13 is detected to the left of the point of the "touch", then it may be assumed that the pen is leaning to the left, see FIGS. 3a and 3b.

According to one aspect the change in position is detected using the size of the distortion of the screen's electrostatic field. According to one aspect the change in position is detected using the amplitude of the distortion of the screen's electrostatic field. For example the size and amplitude may be assumed to increase if the conductive part is brought closer to the touch panel.

According to one aspect the disclosure relates to a computer program, comprising computer readable code which, when run on a wireless network node in a cellular communication system, causes the node to perform the method as described above.

The invention claimed is:

1. A passive capacitive touchpen for inputting information into an electronic device through touching of a capacitive touch panel that has capacitive sensors, the passive capacitive touchpen comprising:
   an elongated body member comprising a conductive part; and
   a conductive tip, disposed at one end of the elongated body member, having a contact surface for contacting the capacitive touch panel,
   wherein a size of an area on the capacitive touch panel touched by the contact surface does not significantly change with changes in orientation of the touchpen,
   wherein the conductive part is longitudinally spaced apart from the conductive tip along the elongated body member and radially larger than the contact surface,
   wherein the conductive tip and conductive part are configured such that, when the contact surface is kept in contact with the capacitive touch panel and the orientation of the touchpen in relation to the capacitive touch panel is changed, the conductive tip and conductive part passively induce a distortion of an electrostatic field of the capacitive touch panel sufficient to register a change in capacitance directly measurable by the capacitive sensors, the distortion of the electrostatic field having a shape of distortion,
   wherein the shape of the distortion indicates the orientation of the touchpen,
   wherein the conductive tip is resiliently retractable into the elongated body member toward the conductive part responsive to an application of a contact pressure of the passive capacitive touchpen with the capacitive touch panel, and
   wherein the conductive tip is mechanically adjustable or interchangeable with another conductive tip to change retraction reaction to contact pressure amount, the distortion of the electrostatic field of the capacitive touch panel being further controlled by the contact pressure amount and retraction reaction of the conductive tip.

2. The passive capacitive touchpen according to claim 1, wherein the conductive tip is thinner than the elongated body member.

3. The passive capacitive touchpen according to claim 1, wherein the distance between the conductive part and the capacitive touch panel is decreased by pushing the resilient retractable conductive tip into the elongated body.

4. The passive capacitive touchpen according to claim 1, wherein the conductive tip is held by an elastic member such that the retraction depends on the contact pressure amount applied on the conductive tip.

5. The passive capacitive touchpen according claim 1, wherein the distance between the conductive part and the capacitive touch panel is decreased by tilting the elongated body member to have a smaller angle with the capacitive touch panel.

6. The passive capacitive touchpen according to claim 1, wherein the conductive part is electrically coupled to the conductive tip.

7. A method in an electronic device of inputting information into the electronic device from a passive capacitive touchpen through touching of a capacitive touch panel having capacitive sensors, the passive capacitive touchpen having an elongated body member that includes a conductive part, and a conductive tip, which is resiliently retractable into the elongated body member toward the conductive part responsive to an application of a contact pressure of the passive capacitive touchpen with the capacitive touch panel, disposed at one end of the elongated body member, the conductive tip having a contact surface for contacting the capacitive touch panel, and wherein the conductive tip is mechanically adjustable or interchangeable with another conductive tip to change retraction reaction to contact pressure amount,     wherein a size of an area on the capacitive touch panel touched by the contact surface does not significantly change with changes in orientation of the touchpen, and     wherein the conductive part is longitudinally spaced apart from the conductive tip along the elongated body member and radially larger than the contact surface;

the method comprising:

detecting contact of the conductive tip at the capacitive touch panel;

measuring a passively induced distortion of an electrostatic field of the capacitive touch panel, caused by the conductive tip and the conductive part, directly by the capacitive sensors, the distortion of the electrostatic field having a shape of distortion controlled by the contact pressure amount and retraction reaction of the conductive tip;

determining a change in orientation of the passive capacitive touchpen in relation to the capacitive touch panel based on the shape of the distortion of the electrostatic field of the capacitive touch panel; and     determining a change in contact pressure of the passive capacitive touchpen with the capacitive touch panel based on the distortion of the electrostatic field of the capacitive touch panel.

8. The method of claim 7 wherein the change in orientation is detected using a size of the distortion of the electrostatic field of the capacitive touch panel.

9. The method of claim 7 wherein the change in orientation is detected using an amplitude of the distortion of the electrostatic field of the capacitive touch panel.

10. A passive capacitive touchpen for inputting information into an electronic device through touching of a capacitive touch panel that has capacitive sensors, the passive capacitive touchpen comprising:

an elongated body member comprising a conductive part; and     a conductive tip, disposed at one end of the elongated body member, having a contact surface for contacting the capacitive touch panel,     wherein a size of an area on the capacitive touch panel touched by the contact surface does not significantly change with changes in orientation of the touchpen,     wherein the conductive part is longitudinally spaced apart from the conductive tip along the elongated body member and radially larger than the contact surface,     wherein the conductive tip is resiliently retractable into the elongated body member toward the conductive part responsive to an application of a contact pressure of the passive capacitive touchpen with the capacitive touch panel, and     wherein the conductive tip is mechanically adjustable or interchangeable with another conductive tip to change retraction reaction to contact pressure amount, whereby a distortion of an electrostatic field of the capacitive touch panel is controlled by the contact pressure amount and retraction reaction of the conductive tip.

\* \* \* \* \*